Patented Feb. 27, 1934

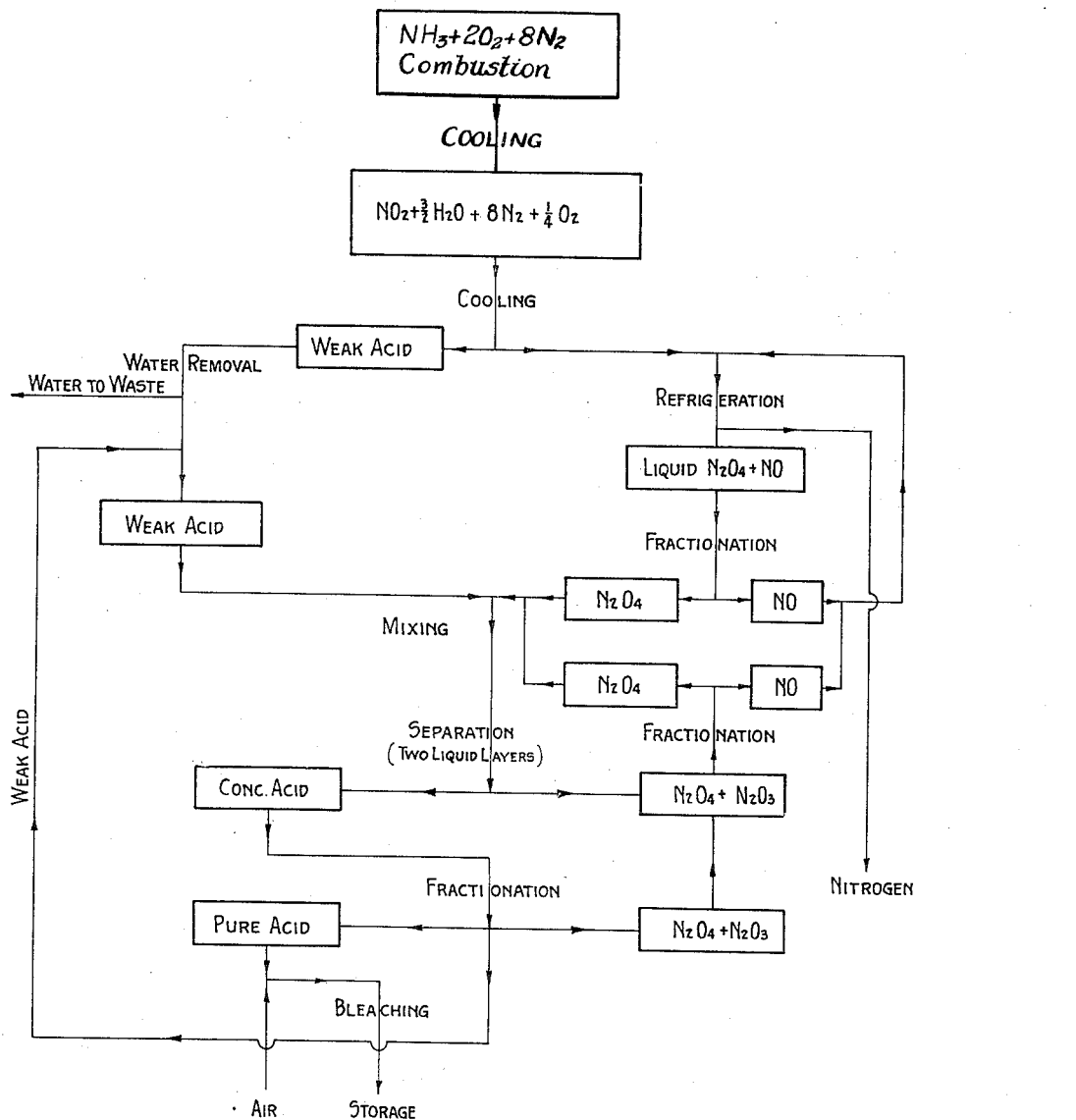

1,948,968

UNITED STATES PATENT OFFICE 1,948,968

PREPARATION OF NITROGENOUS PRODUCTS

Gustav A. Kramer, Oakland, and Ludwig Rosenstein, San Francisco, Calif., assignors to Shell Development Company, San Francisco, Calif., a corporation of Delaware Application August 8, 1931. Serial No. 555,998

22 Claims. (Cl. 23—157)

This invention relates to a method whereby substantially pure nitrogen is prepared from the atmosphere and is further concerned with the preparation of nitric acid of high purity and concentration from the oxides of nitrogen obtained at intermediate stages of the process, without the use of the usual methods of concentration.

Another object resides in the continuous circulation of NO in the process whereby extraneous oxygen is removed from the system prior to the separation of elemental nitrogen and whereby liquefaction of $N_2O_4$ is made possible at the predetermined refrigeration temperature without attendant solidification of the $N_2O_4$.

In the present practice when nitric acid is manufactured by the combustion of ammonia, the nitrogen oxides formed by combustion are, after cooling, brought into contact with the requisite amount of water in absorption towers or equivalent equipment wherein nitric acid of a concentration of from 46% to 52% is formed. For certain purposes, this acid must be further concentrated and as nitric acid and water form a solution of about 63% $HNO_3$ with a maximum boiling point, further concentration is possible only by the use of dehydrating agents such as sulfuric acid and the like. Our invention eliminates these steps of absorption and concentration, thereby greatly decreasing the cost of the product.

We accomplish the production of concentrated nitric acid by first preparing a substantially pure nitrogen peroxide ($N_2O_4$) in liquid form. This on admixture with a limited amount of water, forms two layers, one of which consists substantially of highly concentrated nitric acid and the other, besides the excess of $N_2O_4$, contains lower oxides of nitrogen and certain amounts of their hydrates. We prefer to supply the water required for this reaction in the form of nitric acid of a concentration conveniently obtainable through the condensation of water resulting from the combustion of ammonia with air and the subsequent fractional distillation of this condensate. On the other hand, an aqueous medium such as water or weak acid may be continuously added to liquid $N_2O_4$ and the lower oxides of nitrogen continuously removed substantially as fast as formed, as in a fractionating column. Thus, concentrated nitric acid may be obtained.

The preparation of the liquid peroxide of nitrogen is preferably carried out by low temperature condensation and fractional distillation according to the following manner. The combustion gases coming from the catalytic furnace are first cooled to recover part of the combustion heat, as is customary in like processes, preferably in a waste heat boiler. The cooling in this boiler is not permitted to reach the point where condensation of the water formed by the combustion of ammonia is initiated. Upon further cooling, condensation of water containing some nitric and nitrous acid begins. The cooling operation is so controlled that a substantial part of the oxides of nitrogen formed remains in the gaseous phase. By the time the temperature in the apparatus is low enough for liquefaction of the oxides of nitrogen to begin, water has been to a large extent removed in the form of weak nitric acid.

The gaseous products are next compressed in and treated in a low temperature fractionating system wherein a definite quantity of NO is kept in circulation. The NO may be derived from any source. The purpose of this circulating fluid is threefold: First, it prevents the separation of solid products in the low temperature fractioning system; for while the freezing point of $N_2O_4$ is about $-10°$ C., the freezing point of material having a composition of 63% $N_2O_4$ and 37% NO has a freezing point of about $-112°$ F. By the use of a proper amount of NO, it is possible, therefore, to cool to the desired minimum refrigeration temperature without the separation of any solid material. Second, the excess NO serves to remove from the gases all the remaining free oxygen, by combining therewith to form nitrogen peroxide. Third, the use of NO in this step further simplifies and benefits the first operation of combustion by making it possible to use excess oxygen, which results in better combustion efficiency and increase in the life of the platinum catalyst.

The fractionation of the oxides of nitrogen is carried out so as to produce an end gas which consists of substantially pure nitrogen suitable for the synthesis of ammonia; in other words, the temperature at the top of the fractionating column, where such means is employed, corresponds substantially to the boiling point of nitrogen at the prevailing pressure.

Throughout the various fractionating operations, the cold products, either gaseous or liquid, leaving the system are preferably brought into heat exchanging relations with the fluids entering the system.

The liquid oxides of nitrogen from the heretofore described fractionating system are next sent to another fractionating system wherein the operation is carried on under such conditions that $N_2O_3$ present is decomposed into NO and $NO_2$ so that a separation of NO from $N_2O_4$ will be possible, $N_2O_3$ being unstable in the region of the boiling point of $N_2O_4$. As a result of the fractionation, we obtain substantially pure liquid $N_2O_4$ and substantially pure NO, the latter being returned to the circulating system. The presence of some $N_2O_3$ in the NO does not interfere with the operation of the process but means that a certain amount of $NO_2$ is being recycled. This fractionation is advantageously carried on at a pressure greater than atmospheric although this need not be a necessary condition. Having now obtained pure liquid $N_2O_4$, this is now mixed with the nitric acid which was previously produced by the step of concentrating the weak acid condensate obtained in the cooling of the gases from the combustion chamber. This liquid $N_2O_4$ reacts with the water in this acid and we preferably operate at such a temperature with a corresponding amount of nitric acid that the system stratifies into two liquid layers which are then separated according to conventional methods. One of these layers comprises nitric acid containing in general more than 88% $HNO_3$ and containing also dissolved oxides of nitrogen and the other layer comprises liquid $N_2O_4$ containing $N_2O_3$ and some hydrates of the oxides of nitrogen. The oxides of nitrogen are removed from the concentrated nitric acid layer, as by fractionation. From the product freed from oxides of nitrogen, substantially 100% $HNO_3$ with only occasional traces of oxides of nitrogen may be obtained, as by distillation. The oxides of nitrogen, separated from the nitric acid, are mixed with those obtained in the previous fractionation operation and jointly they are sent to a fractionation system wherein separation of $N_2O_4$ from NO is effected as heretofore described.

Definite advantages flow from the formation of two liquid phases; the separation of the liquid phases from each other; the recovery of $N_2O_4$ from one liquid phase; the return of the $N_2O_4$ in the liquid state to the system; and of the use of liquid $N_2O_4$.

The reaction whereby nitric acid is formed from water and nitrogen peroxide may be written:

$$3NO_2 + H_2O = 2HNO_3 + NO$$

and it is well-known that this reaction is reversible and reaches a definite equilibrium. Starting with nitrogen peroxide and water, it is true that the final concentration of nitric acid reached, that is the concentration which is in equilibrium with the nitrogen peroxide and water, depends on the concentration (or activity—to use the more accurate term) of the nitrogen peroxide. This may be seen by considering the expression for the equilibrium constant of the reaction:

$$K_T = \frac{(C_{HNO_3})^2 P_{NO}}{(P_{NO_2})^3}$$

Where $K_T$ is a constant whose value depends on the temperature only; $C_{HNO_3}$ = concentration of $HNO_3$ at equilibrium; $P_{NO_2}$ = partial pressure (or activity) of the nitrogen peroxide; and $P_{NO}$ = partial pressure (or activity) of the nitrogen monoxide.

If the pressure of $NO_2$ is one atmosphere, the maximum concentration of $HNO_3$ which can be attained at ordinary temperature is approximately 70%. At higher pressure more concentrated nitric acid may be formed and the maximum effect is reached by using the nitrogen peroxide in the liquid state. Nearly 100% $HNO_3$ can then be produced.

Air is blown through the concentrated nitric acid to oxidize the last traces of oxides of nitrogen and to make a substantially water-white product.

Reference will be had to the drawing wherein the solitary figure represents a flow sheet outlining one form of execution of the principles of our invention, it being understood that we do not wish to confine ourselves to any particular arrangement of operation but, on the contrary, refer thereto for purposes of illustration only.

Ammonia is burned with an oxygen containing gas, preferably sufficient in amount to oxidize all the nitrogen to $N_2O_5$ and all the hydrogen to water although less than this amount of oxygen may be used and additional air or oxygen added after water has been removed. The step is carried out in any standard equipment containing a suitable catalyst. The products of combustion after cooling comprise $NO_2$, excess oxygen, elemental nitrogen and some moisture. Upon further cooling most of the water condenses out as weak nitric acid and is removed for further treatment. The gaseous products of combustion are then mixed with an amount of NO sufficient to take up all the oxygen and leave an excess of NO whose amount depends on the minimum temperature to which refrigeration will be carried, and being such that no solid will form on condensation. The gaseous products are fractionated with the aid of refrigeration, thus enabling the procurement of substantially pure nitrogen on the one hand and oxides of nitrogen on the other. The mixture of $N_2O_4$ and NO($N_2O_3$) is fractionated into its component parts. The $N_2O_3$ present is decomposed into NO and $NO_2(N_2O_4)$ and substantially pure NO is recirculated. The $N_2O_4$ thus obtained is combined as a liquid with nitric acid previously obtained by condensation of the water from the combustion products and subsequent concentration. Control is maintained on the addition of the aqueous medium and the temperature so that the mixture stratifies into two layers which are separated. The layer containing $N_2O_4$ and $N_2O_3$ is fractionated to produce $N_2O_4$ and NO. The latter is returned to circulation with prior recovered NO. The $N_2O_4$ is recycled to be again mixed with an aqueous medium. The concentrated acid layer which contains some oxides of nitrogen is fractionated to separate these from the acid. These oxides of nitrogen are mixed with the liquid layer containing $N_2O_4$ and $N_2O_3$ prior to fractionation of the latter. The substantially 100% $HNO_3$ is agitated with air or other oxidizing means whereby the last traces of oxides of nitrogen are obviated and a substantially water-white product results. Any weak acid which may have been obtained during the separation of the oxides of nitrogen from the concentrated nitric acid is returned to the system to increase the production of weak acid prior to mixing the same with liquid $N_2O_4$. It is to be understood that $HNO_3$ of varying strength can be prepared by the above described process and that 100% $HNO_3$ need not be made unless so desired.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results obtained. On the other hand, the invention is to be regarded as limited only by the terms of the accompanying claims, in which it is our intention to claim all novelty inherent therein as broadly as is possible in view of the prior art.

We claim as our invention:

1. A process for treating gases containing nitrogen and oxygen, comprising: adding to said gases a quantity of NO in excess of that required to combine with the oxygen and subjecting the gases to fractional distillation at such a temperature and pressure that liquid oxides of nitrogen are produced as one end product and substantially pure nitrogen as the other.

2. A continuous process for treating gases containing nitrogen and oxygen, comprising: adding to said gases a quantity of NO in excess of that required to combine with the oxygen, separating the oxides of nitrogen from the nitrogen, recovering NO from the former and returning the NO to the oxy-nitrogenous gases undergoing treatment.

3. A continuous process for treating gases containing nitrogen and oxygen, comprising: adding to said gases a quantity of NO in excess of that required to combine with the oxygen, subjecting the gases to fractional distillation at such a temperature and pressure that liquid oxides of nitrogen are produced as one end product and substantially pure nitrogen as the other, recovering NO from the former and returning the NO to the oxy-nitrogenous gases undergoing treatment.

4. A process for treating gases containing nitrogen and oxygen, comprising: adding to said gases a quantity of NO in excess of that required to combine with the oxygen, separating the oxides of nitrogen from the nitrogen, recovering $N_2O_4$ from the oxides of nitrogen and combining it in the liquid state with a limited amount of an aqueous medium.

5. A process for treating gases containing nitrogen and oxygen, comprising: adding to said gases a quantity of NO in excess of that required to combine with the oxygen, separating the oxides of nitrogen from the nitrogen, recovering $N_2O_4$ from the oxides of nitrogen, combining it in the liquid state with a limited amount of an aqueous medium so that two liquid phases form and separating the liquid phases from each other.

6. A process for treating gases containing nitrogen and oxygen, comprising: adding to said gases a quantity of NO in excess of that required to combine with the oxygen, separating the oxides of nitrogen from the nitrogen, recovering NO from the former and returning the NO to the oxy-nitrogenous gases undergoing treatment and combining the resulting $N_2O_4$ in the liquid phase with a limited amount of an aqueous medium.

7. A process for treating gases containing nitrogen and oxygen, comprising: adding to said gases a quantity of NO in excess of that required to combine with the oxygen, separating the oxides of nitrogen from the nitrogen, recovering NO from the former and returning the NO to the oxy-nitrogenous gases undergoing treatment, combining the resulting $N_2O_4$ in the liquid phase with a limited amount of an aqueous medium so that two liquid phases form and separating the liquid phases from each other.

8. A process for treating gases containing nitrogen and oxygen, comprising: adding to said gases a quantity of NO in excess of that required to combine with the oxygen, separating the oxides of nitrogen from the nitrogen, recovering $N_2O_4$ from the oxides of nitrogen, combining it in the liquid state with a limited amount of an aqueous medium so that two liquid phases form, removing the phase containing $N_2O_4$ and $N_2O_3$, recovering therefrom $N_2O_4$ and NO and returning the $N_2O_4$ and NO to the system.

9. A process for treating gases containing nitrogen and oxygen, comprising: adding to said gases a quantity of NO in excess of that required to combine with the oxygen, separating the oxides of nitrogen from the nitrogen, recovering NO from the former and returning the NO to the oxy-nitrogenous gases undergoing treatment, combining the resulting $N_2O_4$ in the liquid phase with a limited amount of an aqueous medium so that two liquid phases form, removing the phase containing $N_2O_4$ and $N_2O_3$, recovering therefrom $N_2O_4$ and NO and returning the $N_2O_4$ and NO to the system.

10. The steps of mixing liquid $N_2O_4$ with a limited amount of an aqueous medium so that two liquid phases form and separating the liquid phases from each other.

11. The step of continuously treating liquid $N_2O_4$ with an aqueous medium and removing the lower oxides of nitrogen substantially as fast as formed.

12. The steps of mixing liquid $N_2O_4$ with a limited amount of an aqueous medium so that two liquid phases form, removing the phase containing $N_2O_4$ and $N_2O_3$ and recovering therefrom $N_2O_4$ which is returned in the liquid state to the system with an aqueous medium.

13. In the process for the production of valuable products by the combustion of ammonia with an oxygen-containing gas, the steps of separating as weak acid the water formed from the products of combustion, concentrating said weak nitric acid, mixing the concentrate with liquid $N_2O_4$ in such amount that the mixture forms two liquid phases, removing the concentrated nitric acid phase and recovering therefrom nitric acid substantially free from oxides of nitrogen.

14. In the process for the production of valuable products by the combustion of ammonia with an oxygen-containing gas, the steps of separating as weak acid the water formed from the products of combustion, concentrating said weak nitric acid, mixing the concentrate with liquid $N_2O_4$ in such amount that the mixture forms two liquid phases, removing the phase containing $N_2O_4$ and $N_2O_3$ and recovering therefrom $N_2O_4$ which is returned in the liquid state to the weak nitric acid.

15. The steps of mixing liquid $N_2O_4$ with a limited amount of an aqueous medium so that the mixture forms two liquid phases, removing the concentrated nitric acid phase and treating the same to effect the removal of oxides of nitrogen therefrom, recovering $N_2O_4$ from the other phase and from the oxides of nitrogen obtained from the concentrated nitric acid phase and returning said $N_2O_4$ as a liquid to the system with fresh amounts of the aqueous medium.

16. In a process for the production of valuable products from the combustion of ammonia with an oxygen-containing gas, the steps of separating the water formed from the products of combustion and removing the oxides of nitrogen from elemental nitrogen by fractionating the resulting oxy-nitrogenous gas mixture in the presence of NO more than sufficient in amount to react with substantially all of the free oxygen present.

17. In a process for the production of valuable products from the combustion of ammonia with an oxygen-containing gas, the steps of separating the water formed from the products of combustion and removing the oxides of nitrogen from elemental nitrogen by fractionating the resulting oxy-nitrogenous gas mixture in the presence of NO sufficient in amount to take up all the free oxygen and prevent the formation of solids under the conditions of fractionation.

18. In a continuous process for the production of valuable products from the combustion of ammonia with an oxygen-containing gas, the steps of separating the water formed from the products of combustion, removing the oxides of nitrogen from elemental nitrogen by fractionating the resulting oxy-nitrogenous gas mixture in the presence of NO sufficient in amount to take up all the free oxygen and prevent the formation of solids under the conditions of fractionation and recovering and recycling NO from the separated mixture of oxides of nitrogen.

19. In a process for making valuable nitrogenous bodies from fluids containing oxygen and nitrogen, the successive steps of partly oxidizing NO to $NO_2$, partly reducing the $NO_2$ to NO, substantially completely separating the NO and $NO_2$ after each oxidizing and reducing stage and returning separately the NO to the oxidizing stage and $NO_2$ to the reducing stage.

20. In a process for making valuable nitrogenous bodies from fluids containing oxygen and nitrogen, the cyclic steps of circulating a quantity of NO in the process in such a manner that at one stage part of the NO is oxidized to $NO_2$ and at another stage part of the $NO_2$ so formed is reduced to NO, substantially completely separating the NO and $NO_2$ after each oxidizing and reducing stage and returning separately the NO to the oxidizing stage and the $NO_2$ to the reducing stage.

21. In a process for making valuable nitrogenous bodies from fluids containing oxygen and nitrogen, the steps of circulating a quantity of NO in excess of that required to combine with the oxygen thereby forming $NO_2$, reducing said $NO_2$ to NO at a subsequent stage, substantially completely separating the NO and $NO_2$ after each oxidizing and reducing stage and returning separately the NO to the oxidizing stage and the $NO_2$ to the reducing stage.

22. In a process for making valuable nitrogenous bodies from fluids containing oxygen and nitrogen, the steps of circulating a quantity of NO in excess of that required to combine with the oxygen thereby forming $NO_2$, reducing said $NO_2$ to NO at a subsequent stage, substantially completely separating NO and $NO_2$ after each oxidizing and reducing stage and returning separately the NO to the oxidizing stage and the $NO_2$ to the reducing stage, the quantity of NO in circulation being kept substantially constant.

GUSTAV A. KRAMER.
LUDWIG ROSENSTEIN.